US006982978B1

(12) United States Patent
Zhang et al.

(10) Patent No.: US 6,982,978 B1
(45) Date of Patent: Jan. 3, 2006

(54) PER USER AND NETWORK ROUTING TABLES

(75) Inventors: Shujin Zhang, San Mateo, CA (US); Xi Xu, Milpitas, CA (US); Maria Alice Dos Santos, Redwood City, CA (US); Jane Jiaying Jin, San Jose, CA (US); Jie Chu, Los Altos, CA (US); Shuxian Lou, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 292 days.

(21) Appl. No.: 10/086,396

(22) Filed: Feb. 28, 2002

Related U.S. Application Data

(63) Continuation of application No. 09/204,639, filed on Dec. 2, 1998, now Pat. No. 6,396,833.

(51) Int. Cl.
*H04L 12/56* (2006.01)

(52) U.S. Cl. .................................. 370/392; 370/401
(58) Field of Classification Search ................ 370/392, 370/401, 235, 357, 359, 360, 378, 383, 394, 370/400
See application file for complete search history.

(56) References Cited

U.S. PATENT DOCUMENTS

| 5,241,594 A | 8/1993 | Kung .............................. 380/4 |
| 5,253,251 A | 10/1993 | Aramaki ...................... 370/60 |

(Continued)

FOREIGN PATENT DOCUMENTS

| WO | 99/53408 | 10/1999 |

OTHER PUBLICATIONS

Ascend Communications, Inc., "Access Control Product Information", 4 pages.
Ascend Communications, Inc., "Remote Access Network Security", printed from http://www.ascend.com/1103.html, on Jul. 24, 1998, pp. 1–8.

(Continued)

*Primary Examiner*—Dang Ton
*Assistant Examiner*—Phuc Tran
(74) *Attorney, Agent, or Firm*—Thelen Reid & Priest LLP; Marc S. Hanish

(57) ABSTRACT

A gateway is provided which routes a packet sent from a user to a connected network utilizing a per-user routing table. This is accomplished by extracting a source address from the packet; finding a per-user routing table corresponding to the source address, the per-user routing table containing entries corresponding to one or more currently accessible networks for the user and the range of network addresses corresponding to the currently accessible networks; extracting a destination address from the packet; seeking an entry in the matching per-user routing table with a range of network addresses containing the destination address; routing the packet to a matching network if the destination address is contained within one of the ranges of network addresses for the currently accessible networks; and routing the packet to a default network if the destination address is not contained within one of the ranges of network addresses for the currently accessible networks. This allows different users to have access to a different set of networks and allows a user to select the network he wishes to access. The gateway may also guarantee that packet are routed through a particular destination ISP or network by looking up the destination ISP or network in a table, each entry in the table having a router network address corresponding to each network currently accessible; establishing a tunneling session to the matching router network address; and forwarding the packet to the router network address through the tunneling session.

23 Claims, 5 Drawing Sheets

U.S. PATENT DOCUMENTS

| | | | |
|---|---|---|---|
| 5,502,725 A | 3/1996 | Pohjakallio | 370/94.1 |
| 5,555,244 A | 9/1996 | Gupta et al. | 370/60.1 |
| 5,570,361 A | 10/1996 | Norizuki et al. | 370/60.1 |
| 5,583,862 A | 12/1996 | Gupta et al. | 370/60.1 |
| 5,592,470 A | 1/1997 | Rudrapatna et al. | 370/320 |
| 5,617,417 A | 4/1997 | Sathe et al. | 370/394 |
| 5,655,077 A | 8/1997 | Jones et al. | 395/187.01 |
| 5,671,354 A | 9/1997 | Ito et al. | 395/187.01 |
| 5,673,265 A | 9/1997 | Gupta et al. | 370/432 |
| 5,684,950 A | 11/1997 | Dare et al. | 395/187.01 |
| 5,699,521 A | 12/1997 | Iizuka et al. | 395/200.15 |
| 5,740,171 A | 4/1998 | Mazzola et al. | 370/392 |
| 5,740,176 A | 4/1998 | Gupta et al. | 370/440 |
| 5,793,763 A | 8/1998 | Mayes et al. | 370/389 |
| 5,799,017 A | 8/1998 | Gupta et al. | 370/419 |
| 5,802,047 A | 9/1998 | Kinoshita | 370/359 |
| 5,802,316 A * | 9/1998 | Ito et al. | 709/249 |
| 5,835,720 A | 11/1998 | Nelson et al. | 395/200.54 |
| 5,835,727 A | 11/1998 | Wong et al. | 395/200.68 |
| 5,845,070 A | 12/1998 | Ikudome | 395/187.01 |
| 5,872,783 A | 2/1999 | Chin | 370/392 |
| 5,918,016 A | 6/1999 | Brewer et al. | 395/200.5 |
| 5,944,824 A | 8/1999 | He | 713/201 |
| 5,959,990 A | 9/1999 | Frantz et al. | 370/392 |
| 5,991,810 A | 11/1999 | Shapiro et al. | 709/229 |
| 5,991,828 A | 11/1999 | Horie et al. | 710/8 |
| 6,009,103 A * | 12/1999 | Woundy | 370/401 |
| 6,011,910 A | 1/2000 | Chau et al. | 395/200.59 |
| 6,018,770 A * | 1/2000 | Little et al. | 709/223 |
| 6,021,496 A * | 2/2000 | Dutcher et al. | 713/202 |
| 6,055,236 A | 4/2000 | Nessett et al. | 370/389 |
| 6,091,951 A | 7/2000 | Sturniolo et al. | 455/432 |
| 6,092,178 A * | 7/2000 | Jindal et al. | 712/27 |
| 6,092,196 A * | 7/2000 | Reiche | 713/200 |
| 6,119,160 A | 9/2000 | Zhang et al. | 709/224 |
| 6,141,687 A | 10/2000 | Blair | 709/225 |

OTHER PUBLICATIONS

Carrel, D. et al., "The TACACS+ Protocol", Version 1.78, Cisco Systems, Inc., printed from ftp://ftp–eng.cisco.com/edweber/tac–rfc.1.78.txt on Oct. 23, 2000.

Cisco Systems, Inc., "Layer 2 Tunnel Protocol", Release 12.0(1)T and 11.3(5)AA, pp. 1–53.

Droms, R., "Dynamic Host Configuration Protocol", Network Working Group, RFC 1531, Oct. 1993.

NAT and Networks, printed from http://www.csn.tu-chemitz.de/~mha/linux–ip–nat/diplom/node4.html, on Sep. 19, 1998.

NAT–PC Webopaedia Definition and Links. 1998, Mecklermedia Corporation, printed from http://webopedia.internet.com/TERM/N/NAT.html, on Sep. 19, 1998, 1 page.

Network Address Translation Information:, printed frm http://www.uq.edu.au/~gadmacka/content/natinformation.htm, on Sep. 19, 1998.

Perkins, D., "Requirements for an Internet Standard Point–to–Point Protocol", Dec. 1993, Network Working Group, RFC 1547, pp. 1–19.

Simpson, W., "The Point–to–Point Protocol (PPP)", Dec. 1993, Network Working Group, RFC 1548, pp. 1–53.

* cited by examiner

| 402 ⎯ | | |
|---|---|---|
| | NETWORK #1 | ROUTER NETWORK ADDRESS ⎯ 406 |
| 404 ⎯ | NETWORK #2 | ROUTER NETWORK ADDRESS |
| | NETWORK #3 | ROUTER NETWORK ADDRESS |
| | ⋮ | ⋮ |

400

PER USER AND NETWORK ROUTING TABLES

This application is a continuation of U.S. Ser. No. 09/204,639, filed Dec. 2, 1998, now U.S. Pat. No. 6,396,833.

BACKGROUND OF THE INVENTION

1. Field of the Invention

The present invention relates to the field of computer networks. More particularly, the present invention relates to a per user routing table indexed by an IP address and a network routing table to more efficiently route packets in systems where a user may connect to multiple networks.

2. The Background

The Transmission Control Protocol/Internet Protocol (TCP/IP) is a common networking protocol which has become even more popular during the rise of the Internet Sending or receiving information using the TCP/IP protocol requires encapsulating information into packets. Each packet includes a header and a payload. The header contains information related to the handling of the payload by a receiving host or routing device, while the payload contains part or all of the user information. The information in the header includes the sender's and the recipient's addresses and is used to route the packet through the Internet until the packet is received by a host having an IP address that matches the packet's destination address (when referring to the source address and destination address of a packet, the source address and destination address are commonly referred to as "SA" and "DA", respectively). This enables users to accurately send and receive information to and from each other through their respective host computers.

In recent years, "intranets" have been rising in popularity, especially with large companies. An intranet is an internal network that serves only a specific type of person (such as employees of a corporation, or students at a school). The intranet is usually not accessible to the general public. Intranets have become popular mainly because they allow for much more productive communication between users within the network, even when the users are dispersed over a wide geographic area (such as in multi-national corporations).

FIG. 1 is a block diagram depicting one way to connect to an intranet. Personal computer 10 connects through a link 12, generally a Point-to-Point Protocol (PPP) link, to an Internet service provider (ISP) or access point (AP)14. The ISP or AP 14 then connects through link 16 to the Intranet 18.

Recently, it has become possible to have simultaneous connection to multiple networks from a single link. The ISP may utilize a gateway to interface the user and the multiple networks. A gateway is a device which performs protocol conversion between different types of networks or applications. The term gateway is not meant to be limited to a single type of device, as any device, hardware or software, that-may act as a bridge between the user and the networks may be considered a gateway for purposes of this application. FIG. 2 is a diagram illustrating the use of a gateway to couple multiple networks. Computer 80 connects to gateway 82 through a modem 84, while computers 86a and 86b couple to a router 88, then through modem 90 to gateway 82. Gateway 82 may then interface computers 80, 86a, and 86b to multiple networks. These may include a first corporate intranet 92, a second corporate intranet 94, and the Internet 96.

A problem occurs at the gateway level, however, in determining to which network to route a packet sent by the user. This is further complicated by the fact that most gateways support multiple simultaneous users, each potentially having access to different multiple simultaneous networks.

What is needed is a solution which effectively manages the routing chores of a gateway in a system with users capable of simultaneous connection to multiple networks.

An additional routing problem is encountered when the decision to which network to route the packet is made and the packet is actually forwarded to that network. Due to the geographic distances between (or within) most ISPs, traffic is generally passed to networks through the use of "hops". In order to get a packet to its destination, an ISP passes the packet to a first hop. Each hop is generally a gateway or router which passes the packet along to the next hop, until it eventually reaches its destination. FIG. 3 is a diagram illustrating the use of hops in a system in which a user is simultaneously connected to two networks. User 100 transmits a packet to gateway 102 which it intends to send to first network 104. Gateway 102 receives the packet and determines that it must be forwarded to the first network. Since there is no direct connection between the gateway 102 and the first network 104, it must pass it to a first hop 106, which then must examine the packet and determine that it should be passed along again (rather than sent to the local area network attached to first hop 106), so it passes it to second hop 108. This process continues until the packet reaches a hop 110 attached to first network 104.

One problem with using hops to examine and forward packets is that sometimes it may be necessary to route the packet through a particular ISP. For example, a user may sign up for service from a particular ISP. The ISP may offer varying levels of service, including faster network communications for its higher paying users. This is only one example of a reason to require that a packet be forwarded to a particular ISP. One of ordinary skill in the art will recognize that there may be other reasons why a gateway would need to forward a packet to a particular ISP. Whatever the reason, rather than simply forwarding packets to the Internet, it becomes necessary to guarantee that the packets travel through the particular ISP before being routed to the Internet.

What is further needed is a solution which allows a gateway to transmit packets through hops in a way that guarantees that the packets are routed through a particular ISP or network.

SUMMARY OF THE INVENTION

A gateway is provided which routes a packet sent from a user to a connected network utilizing a per user routing table. This is accomplished by extracting a source address from the packet; finding a per-user routing table corresponding to said source address, said per-user routing table containing entries corresponding to one or more currently accessible networks for the user and the range of network addresses corresponding to said currently accessible networks; extracting a destination address from the packet; seeking an entry in said matching per-user routing table with a range of network addresses containing said destination address; routing the packet to a matching network if said destination address is contained within one of said ranges of network addresses for said currently accessible networks, and routing the packet to a default network if said destination address is not contained within one of said ranges of network addresses for said currently accessible networks. This allows different users to have access to a different set of networks and allows a user to select the network he wishes to access. The gateway may also guarantee that packets are routed through a particular destination ISP or network by looking up said destination ISP or network in a table, each entry in said table having a router network address corresponding to each network currently accessible; establishing a tunneling session to said matching router network address; and forwarding the packet to said router network address through said tunneling session.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

In accordance with a presently preferred embodiment of the present invention, the components, process steps, and/or data structures are implemented using a gateway device. Different implementations may be used and may include other types of operating systems, computing platforms, computer programs, and/or general purpose machines. In addition, those of ordinary skill in the art will readily recognize that devices of a less general purpose nature, such as hardwired devices, devices relying on FPGA or ASIC technology, or the like, may also be used without departing from the scope and spirit of the inventive concepts disclosed herein.

Figure 1:
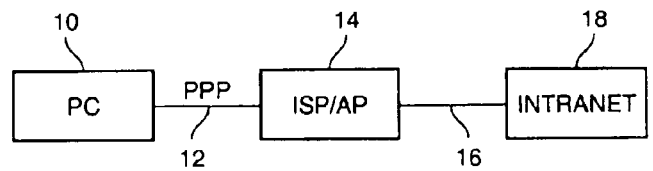
FIG. 1 is a block diagram illustrating the typical connection to an intranet.
Figure 2:
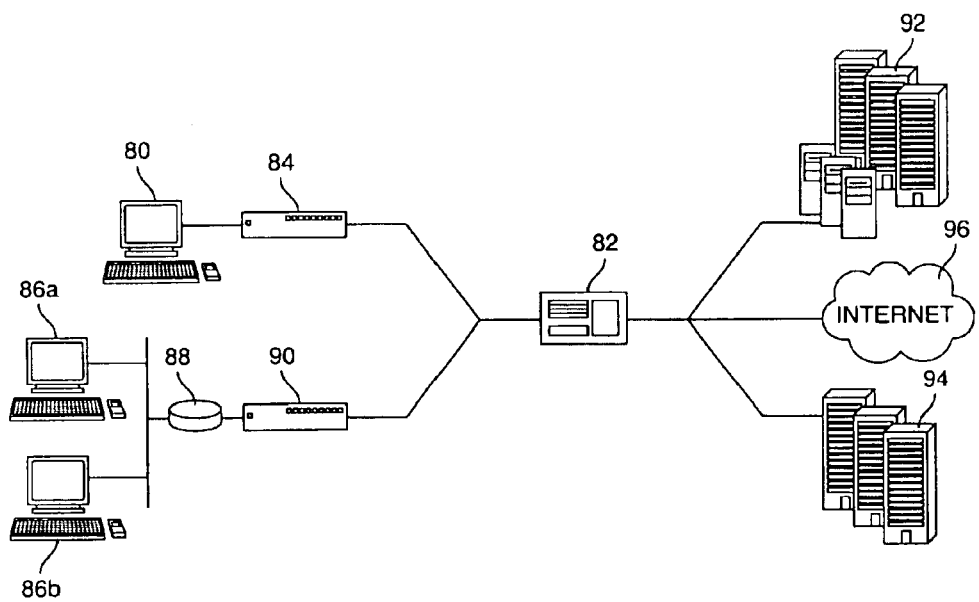
FIG. 2 is a diagram illustrating the use of a gateway to coupled multiple networks.
Figure 3:
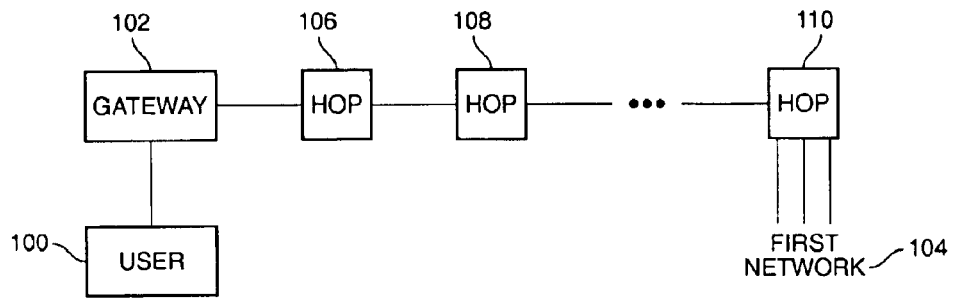
FIG. 3 is a diagram illustrating the use of hops in a system in which the user is simultaneously connected to two networks.
Figure 4:
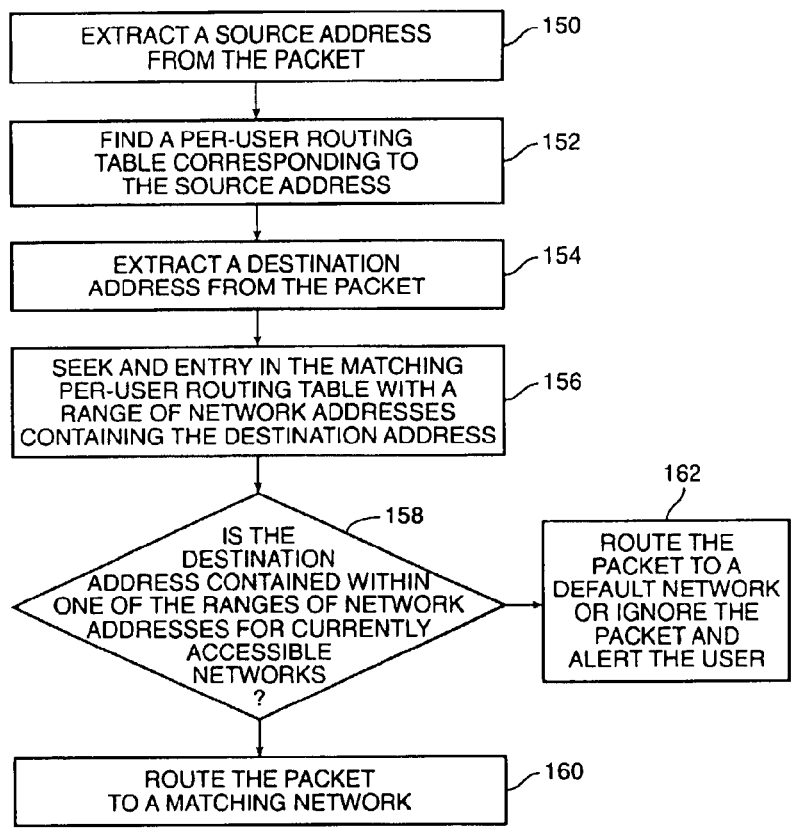
FIG. 4 is a flow diagram illustrating a method for routing a packet sent from a user in a system in which the user may be connected to multiple networks simultaneously in accordance with a presently preferred embodiment of the present invention.
Figure 5:
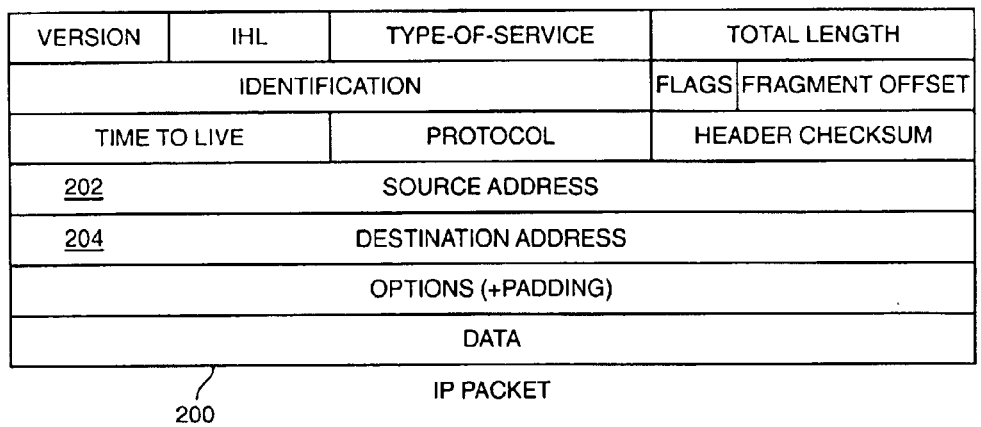
FIG. 5 is a diagram illustrating a packet in accordance with the IP protocol.

FIG. 4 is a flow diagram illustrating a method for routing a packet sent from a user in a system in which the user may be connected to multiple networks simultaneously in accordance with a presently preferred embodiment of the present invention. At 150, a source address is extracted from the packet. FIG. 5 is a diagram illustrating a packet in accordance with the IP protocol. Packet 200 contains a source address 202, indicating the source IP address of the packet, and a destination address 204, indicating the destination IP address of the packet. Other protocols contain similar fields. Therefore, at 150 of FIG. 4, the source address is extracted from the source address field 202 of FIG. 5.

Figures 6, 7:
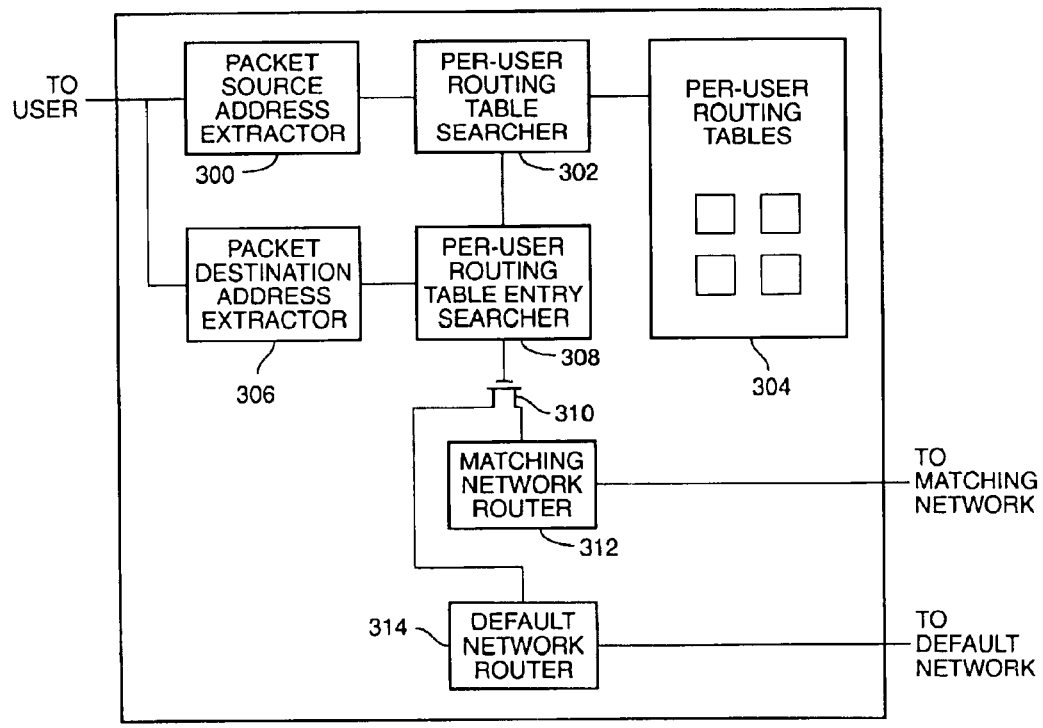
FIG. 6 is a diagram illustrating a per-user routing table in accordance with a presently preferred embodiment of the present invention.
FIG. 7 is a block diagram illustrating a gateway for routing a packet sent from a user in a system in which the user may be connected to multiple networks simultaneously in accordance with a presently preferred embodiment of the present invention.

At 152, the source address is used to find a per-user routing table corresponding to the user who sent the packet. FIG. 6 is a diagram illustrating a per-user routing table in accordance with a presently preferred embodiment of the present invention. Each per user routing table 250 contains a user address 252, indicating the host address of the user to which the routing table corresponds. Then the per-user routing table contains one or more entries 254, each entry corresponding to a currently accessible network for the corresponding user. Each entry 254 may contain a range of addresses 256, indicating the network addresses which correspond to the corresponding accessible network, and a network identification 258, which identifies the corresponding accessible network. The range of addresses 256 will likely be the network addresses for all possible users in each network. Generally, when a network is first configured, it is assigned a range of addresses for all of its users. Not all the users may be logged on at any one moment, and some of the network addresses in the range may never be used, but this range still provides a way to determine if a packet should be routed to the network. Entries 254 are continuously updated by the gateway to reflect the currently accessible networks for each user connected to the gateway. Thus entries may be added, modified, or deleted as necessary.

At 152 of FIG. 4, the gateway searches through one or more of the per-user routing tables (250 of FIG. 6) to find a per-user routing table corresponding to the source address. This may be accomplished by comparing the source address to the user address field (252 of FIG. 6) of each per-user routing table until a match is found.

At 154, a destination address (204 of FIG. 5) is extracted from the packet. At 156, the entries (254 of FIG. 6) of the matching per-user routing table are traversed (or otherwise searched), looking for a range of network addresses (256 of FIG. 6) containing the destination address. At 158, if the destination address is contained within one of the ranges of network addresses for currently accessible networks, the process moves to 160, where the packet may be routed to a matching network. A matching network may be determined by examining the network identification (258 of FIG. 6) of the entry (254 of FIG. 6) with the address range (256 of FIG. 6) containing the destination address.

If, at 158, the destination address was not contained within any of the ranges of network addresses for currently accessible networks, the packet may be routed to a default network. The default network may be set up by the user, or by an administrator at the gateway level. It is also conceivable that the gateway will simply forward the packet to the largest currently accessible network at this point, because the largest network has the greatest chance of having a connection to the Internet, and the Internet provides the best chance for the packet to eventually reach its destination (the size of network may be measured in terms of the number of nodes that it contains). The gateway may also simply ignore the packet at this point, rather than sending it to a default network, and send a message to the user informing him that a packet has an invalid destination address or that the packet is being ignored.

These methods allow different users to have access to different sets of networks, and also allow the user some flexibility in choosing which network to access.

FIG. 7 is a block diagram illustrating a gateway for routing a packet sent from a user in a system in which the user may be connected to multiple networks simultaneously in accordance with a presently preferred embodiment of the present invention. A packet source address extractor 300 extracts a source address from a packet received from a user. The packet source address extractor 300 is coupled to a per-user routing table searcher 302. A per-user routing table searcher 302 is coupled to one or more per-user routing tables 304 and searches through one or more of the per-user routing tables 304 to find a per-user routing table corresponding to the source address. This may be accomplished by comparing the source address to the user address field (252 of FIG. 6) of each per-user routing table until a match is found.

Figure 8:
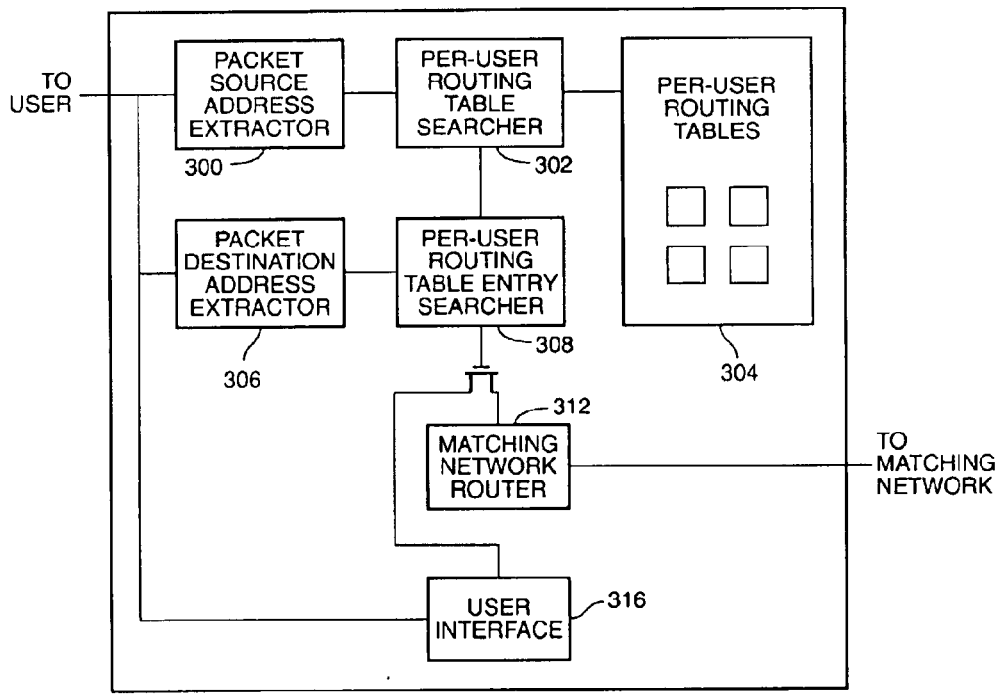
FIG. 8 is a block diagram illustrating a gateway for routing a packet sent from a user in a system in which the user may be connected to multiple networks simultaneously in accordance with an alternative embodiment of the present invention.

A packet destination address extractor 306 extracts a destination address from the packet. A per-user routing table entry seeker 308 is coupled to the packet destination address extractor 306 and to the per-user routing table searcher 302. The per-user routing table traverser 308 searches through the entries in the table retrieved by the per-user routing table searcher 302 until it finds a range of addresses which contains the destination address extracted by the packet destination address extractor 306. A switch 310 couples the per-user routing table traverser 308 to a matching network router 312 if a matching network was found by the per-user routing table traverser. The matching network router 312 routes the packet to the matching network. If no matching network was found, the switch 310 couples the per-user routing table traverser 308 to a default network router 314, which routes the packet to a default network. The default network may be set by a user or administrator or may be set to some other criteria, as in routing the packet to the largest accessible network. FIG. 8 is an alternative embodiment of the present invention in which the default network router 314 is replaced by a user interface 316, which sends a message to the user that the packet is being ignored or that the destination address of the packet is invalid.

Figure 9:
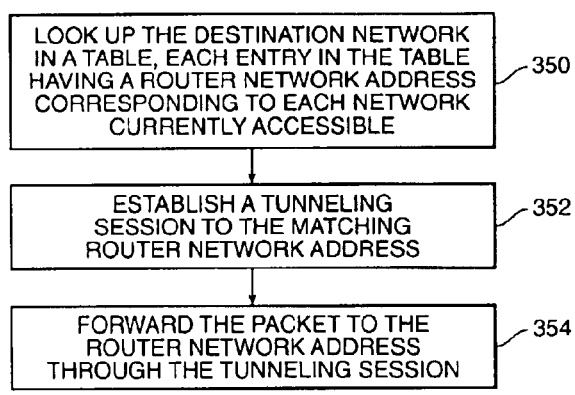
FIG. 9 is a flow diagram illustrating a method for routing a packet sent from the user in a system in which the user may be connected to multiple networks simultaneously in accordance with an alternative embodiment of the present invention.
Figures 10, 11:
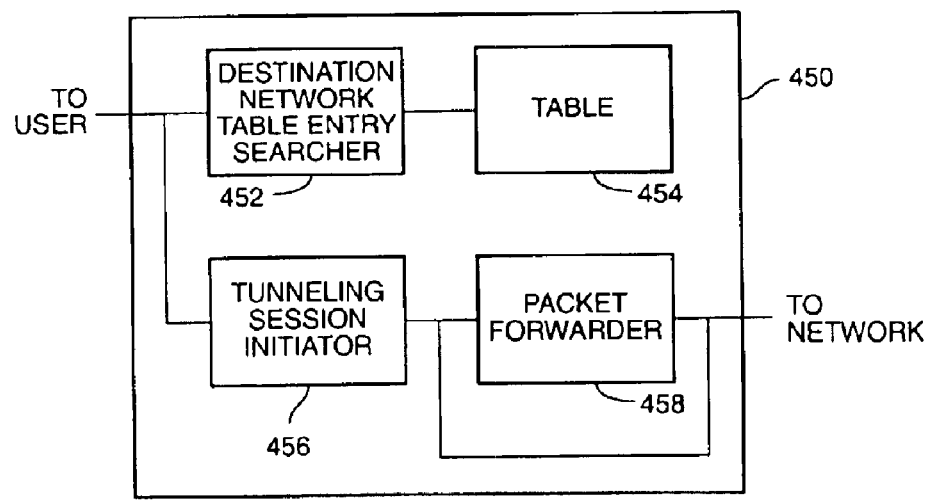
FIG. 10 is a diagram illustrating a table for use with the embodiment of FIG. 9 in accordance with an alternative embodiment of the present invention.
FIG. 11 is a block diagram illustrating a gateway for routing a packet sent from the user in a system in which the user may be connected to multiple networks simultaneously in accordance with an alternative embodiment of the present invention.

FIG. 9 is a flow diagram illustrating a method for routing a packet sent from a user in a system in which the user may be connected to multiple networks simultaneously. At 350, the destination network of the packet is looked up in a table, each entry in the table having a router network address corresponding to each network currently accessible. This is not a per-user routing table, but rather a table containing an updated list (or other data structure) of the router network addresses of each currently accessible network. FIG. 10 is a diagram illustrating such a table in accordance with a presently preferred embodiment of the present invention. Table 400 contains one or more entries 402. Each entry 402 contains an identification of the network 404, and a router network address for the corresponding network. The router network address is the precise network addresses that the router for the corresponding network is located. This table may be stored in the gateway or may be located in a service profile that is retrieved from an external device. Referring back to FIG. 9, at 350, the table is searched until a matching entry for the destination network is found.

At 352, the corresponding router network address from the matching entry is used to establish a tunneling session between the gateway and the matching router network address. Tunneling allows two hosts on the same type of network to communicate even though there may be different types of network in between. Tunneling is accomplished by encapsulating packets sent from a first type of network within packets of a type compatible with a second type of network for the duration of the packet's journey through the second type of network. Then, the outer packet is stripped off (and possibly some demultiplexing takes place) when the packet reaches the first type of network again. Layer Two Tunneling Protocol (L2TP) is a specific tunneling protocol that acts as an extension to the PPP protocol to allow ISPs to operate virtual private networks. L2TP or any other tunneling protocol may be used when establishing the tunneling session.

A tunneling session does not need to be established if one already exists between the gateway and the matching router network address. If this is the case, the process may simply move to 354 as establishing a second tunneling session to the same destination would be redundant.

At 354, the packet is forwarded to the router network address through the tunneling session established in 352. This allows the router to guarantee that the packet is routed to the particular ISP or network listed in the table. The ISP or network listed in the table corresponding to the destination network address may be a network or ISP that the users subscribe to, thus necessitating that all traffic directed to the Internet from the users must pass through the network or ISP. However, there may be other reasons why one would want to pass certain traffic through a particular ISP or network and the reason listed above should not be read as limiting.

FIG. 11 is a block diagram illustrating a gateway in accordance with this alternative embodiment of the present invention. Gateway 450 contains a destination network table entry searcher 452 coupled to a table 454, which looks up the destination address of the packet in the table 454, each entry in the table having a router network address corresponding to each network currently accessible. This is the table of FIG. 10.

A tunneling session initiator 456 is coupled to the destination network table entry searcher 452 and establishes a tunneling session between the gateway and the matching router network address. A packet forwarder 458 is coupled to the tunneling session initiator 456 and forwards the packet to the router network address through the tunneling session established by the tunneling session initiator 456.

The gateway of FIG. 11 and the gateway of FIG. 7 may also be combined in a single gateway which performs both functions.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A gateway for routing a packet sent from a user in a system in which the user may be connected to multiple networks simultaneously, said packet having a destination network, the gateway including:
   a table unique to the user, each entry in said table having a router network address corresponding to each network currently accessible;
   a destination network table entry searcher coupled to said table;
   a tunneling session initiator coupled to said matching network router; and
   a packet forwarder coupled to said tunneling session initiator.

2. The gateway of claim 1, wherein said table is contained in a service profile.

3. The gateway of claim 1, wherein said matching network router is coupled to an accessible network corresponding to a range of addresses in which a destination address is found.

4. The gateway of claim 1, wherein said tunneling session initiator is coupled to a matching network router if said destination address of the packet is contained within one of said entries.

5. The gateway of claim 1, wherein said tunneling session initiator is coupled to a default network router if said destination address of the packet is not contained within one or said entries.

6. The gateway of claim 5, wherein said default network router is coupled to the largest accessible network.

7. A program storage device readable by a machine, tangibly embodying a program of instructions executable by the machine to perform method steps for routing a packet sent from a user in a system in which the user may be connected to multiple networks simultaneously, said packet having a destination network, said method steps comprising:
   looking up said destination network in a table, each entry in said table having a router network address corresponding to each network currently accessible, wherein said table corresponds only to the user;
   establishing a tunneling session to said corresponding router network address; and
   forwarding the packet to said corresponding router network address through said tunneling session.

8. A gateway for routing a packet sent from a user in a system in which the user may be connected to multiple networks simultaneously, said packet having a destination network, the gateway including:
   a table unique to the user, each entry in said table having a router network address corresponding to each network currently accessible;
   a destination network table entry searcher coupled to said table;
   a matching network router coupled to said destination network table entry searcher if the destination network is listed in said table;
   a tunneling session initiator coupled to said matching network router; and
   a packet forwarder coupled to said tunneling session initiator.

9. The gateway of claim 8, wherein said table is contained in a service profile.

10. An apparatus for routing a packet sent from a user in a system in which the user may be connected to multiple networks simultaneously, including:
    means for extracting a source address from the packet;
    means for finding a per-user routing table corresponding to said source address, said per-user routing table corresponding only to the user and containing entries corresponding to one or more currently accessible networks for the user and the range of network addresses corresponding to said currently accessible networks;
    means for extracting a destination address from the packet;
    means for seeking an entry in said matching per-user routing table with a range of network addresses containing said destination address;
    means for routing the packet to a matching network if said destination address is contained within one of said ranges of network addresses for said currently accessible networks; and
    means for routing the packet to a default network if said destination address is not contained within one of said ranges of network addresses for said currently accessible networks.

11. The apparatus of claim 10, wherein said matching network is said accessible network corresponding to said range of addresses in which said destination address is found.

12. The apparatus of claim 10, wherein said default network is the largest accessible network.

13. An apparatus for routing a packet sent from a user in a system in which the user may be connected to multiple networks simultaneously, including:
    means for extracting a source address from the packet;
    means for finding a per-user routing table corresponding to said source address, said per-user routing table corresponding only to the user and containing entries corresponding to one or more currently accessible networks for the user and the range of network addresses corresponding to said currently accessible networks;
    means for extracting a destination address from the packet;
    means for seeking an entry in said matching per-user routing table with a range of network addresses containing said destination address;
    means for routing the packet to a matching network if said destination address is contained within one of said ranges of network addresses for said currently accessible networks; and
    means for ignoring said packet and alerting the user to that effect if said destination address is not contained within one of said ranges of network addresses for said currently accessible networks.

14. The apparatus of claim 13, wherein said matching network is said accessible network corresponding to said range of addresses in which said destination address is found.

15. An apparatus for routing a packet sent from a user in a system in which the user may be connected to multiple networks simultaneously, said packet having a destination network, the apparatus including:
    means for looking up said destination network in a table, each entry in said table having a router network address corresponding to each network currently accessible;
    means for establishing a tunneling session to said matching router network address; and
    means for forwarding the packet to said router network address through said tunneling session.

16. The apparatus of claim 15, wherein said table is contained in a service profile.

17. An apparatus for routing a packet sent from a user in a system in which the user may be connected to multiple networks simultaneously, including:

means for extracting a source address from the packet;

means for finding a per-user routing table corresponding to said source address, said per-user routing table corresponding only to the user and containing entries corresponding to one or more accessible networks for the user and the range of network addresses corresponding to said currently accessible networks;

means for extracting a destination address from the packet;

means for reading the entries of said matching per-user routing table, looking for a range of network addresses containing said destination address;

means for determining a destination network based upon a matching entry in said per-user routing table if said destination address is contained within one of said ranges of network addresses for said currently accessible networks;

means for routing the packet to a default network if said destination address is not contained within one of said ranges of network addresses for said currently accessible networks, means for looking up said destination network in a table, each entry in said table having a router network address corresponding to each network currently accessible;

means for establishing a tunneling session to said corresponding router network address; and means for forwarding the packet to said router network address through said tunneling session.

18. The apparatus of claim 17, wherein said destination network is one of said accessible networks corresponding to said range of addresses in which said destination address is found.

19. The apparatus of claim 17, wherein said default network is the largest accessible network.

20. The apparatus of claim 17, wherein said table is contained in a service profile.

21. An apparatus for routing a packet sent from a user in a system in a system in which the user may be connected to multiple networks simultaneously, including:

means for extracting a source address from the packet;

means for finding a per-user routing table corresponding to said source address, said per-user routing table corresponding only to the user and containing entries corresponding to one or more accessible networks for the user and the range of network addresses corresponding to said currently accessible networks;

means for extracting a destination address from the packet;

means for reading the entries of said matching per-user routing table, looking for a range of network addresses containing said destination address;

means for determining a destination network based upon a matching entry in said per-user routing table if said destination address is contained within one of said ranges of network addresses for said currently accessible networks;

means for ignoring said packet and alerting the user to that effect if said destination address is not contained within one of said ranges of network addresses for said currently accessible networks;

means for looking up said destination network in a table, each entry in said table having a router network address corresponding to each network currently accessible;

means for establishing a tunneling session to said corresponding router network address; and means for forwarding the packet to said corresponding router network address through said tunneling session.

22. The apparatus of claim 21, wherein said matching network is one of said accessible network corresponding to said range of addresses in which said destination address is found.

23. The apparatus of claim 21, wherein said table is contained in a service profile.

\* \* \* \* \*